(12) United States Patent
Shida et al.

(10) Patent No.: US 8,047,752 B2
(45) Date of Patent: Nov. 1, 2011

(54) FASTENER ASSEMBLY AND MULTI-LAYERED STRUCTURE

(75) Inventors: Mitsuzo Shida, Long Grove, IL (US); Terry Michael Finerman, Arlington Heights, IL (US)

(73) Assignee: MSI Technology L.L.C., Arlington Heights, IL (US)

( * ) Notice: Subject to any disclaimer, the term of this patent is extended or adjusted under 35 U.S.C. 154(b) by 995 days.

(21) Appl. No.: 11/767,838

(22) Filed: Jun. 25, 2007

(65) Prior Publication Data
US 2008/0317563 A1  Dec. 25, 2008

(51) Int. Cl.
*F16B 15/08* (2006.01)
(52) U.S. Cl. .......... 411/443; 411/442; 206/344
(58) Field of Classification Search .......... 411/444, 411/445, 442–443; 206/343–344
See application file for complete search history.

(56) References Cited

U.S. PATENT DOCUMENTS

| | | | |
|---|---|---|---|
| 3,442,374 A | 5/1969 | Hiller | |
| 3,471,008 A * | 10/1969 | Cast et al. | 206/344 |
| 3,756,391 A | 9/1973 | Keck et al. | |
| 3,851,759 A | 12/1974 | Young et al. | |
| 3,966,042 A | 6/1976 | Shelton et al. | |
| 4,087,587 A | 5/1978 | Shida et al. | |
| 4,087,588 A | 5/1978 | Shida et al. | |
| 4,298,712 A | 11/1981 | Machonis, Jr. et al. | |
| 4,343,579 A * | 8/1982 | Shelton et al. | 411/442 |
| 4,971,503 A | 11/1990 | Barnell et al. | |
| 5,005,699 A | 4/1991 | Kawashima et al. | |
| 5,149,237 A * | 9/1992 | Gabriel et al. | 411/446 |
| 5,198,327 A | 3/1993 | Yamada et al. | |
| 5,547,325 A * | 8/1996 | Tucker et al. | 411/442 |
| 5,733,085 A * | 3/1998 | Shida et al. | 411/442 |
| 5,795,121 A * | 8/1998 | Tucker et al. | 411/442 |
| 6,029,814 A | 2/2000 | Ohuchi | |
| 6,082,536 A | 7/2000 | Ito et al. | |
| 7,064,163 B2 * | 6/2006 | Shida | 525/70 |
| 7,108,130 B2 | 9/2006 | Herelier et al. | |
| 7,172,103 B2 | 2/2007 | Fujiyama et al. | |
| 7,198,446 B2 | 4/2007 | Yoshizawa | |
| 7,273,337 B2 * | 9/2007 | Lat et al. | 411/443 |

FOREIGN PATENT DOCUMENTS

| | | |
|---|---|---|
| CA | 1086269 | 9/1980 |
| EP | 0 908 635 A1 | 4/1999 |

\* cited by examiner

*Primary Examiner* — Victor Batson
*Assistant Examiner* — Roberta Delisle
(74) *Attorney, Agent, or Firm* — Dobrusin & Thennisch PC (57) ABSTRACT

A fastener assembly, such as a nail assembly, includes a row of fasteners held together and maintained in position by a multi-layered structure including a first polymeric layer having a first surface for contacting the fasteners and a second surface and including a polymer with at least one polar moiety; and a second polymeric layer is disposed on the first polymeric layer over the second surface, the second polymeric layer being sufficiently rigid for reinforcing the first polymeric layer.

21 Claims, 1 Drawing Sheet

FASTENER ASSEMBLY AND MULTI-LAYERED STRUCTURE

FIELD OF THE INVENTION

The present invention relates to fastener assemblies, such as nail strips, for use with rapid-acting driving tools, such as nail guns.

BACKGROUND OF THE INVENTION

Fast-acting fastener driving tools are commonplace in the building industry. A plurality of fasteners, such as nails, screws or staples, are assembled in strip assemblies that are adapted for use in the magazine of such tools. It has been the general practice to provide such strip assemblies in a generally flat construction, in which fasteners are aligned generally parallel to one another, and are maintained in position by being bonded to a substrate. An example of one such structure is depicted in U.S. Pat. No. 5,733,085, incorporated herein by reference.

A successful fastener assembly, such as a nail strip, will depend upon various factors. Among them are the ease of use, the cost of manufacture, and reliability. By way of illustration, for a number of nailing applications, it has been regarded as important for a nail strip to be durable while being transported to and handled on the worksite, such that the strip of nails is intact when the carpenter is ready to use them, and preferably such that the nails are generally in proper alignment. It also has been regarded as desirable for the nail strip to be easily loaded into a magazine of the nail gun, with minimal force and without buckling (referred to in the art as "corrugation") or other damage to the strip.

For helping to achieve a successful fastening operation, particularly using a power driving tool, the ability to manage (particularly on a consistent and reproducible basis) the energy needed to drive the fastener also has been regarded as important. In addition to the necessary energy to pass the nail into or through a workpiece, there is a component of energy needed for simply detaching the fastener from the nail strip. Of course, since many of these power driving tools are handled by human workers, weight and ergonomic considerations abound as well.

Another consideration for fastener assemblies is that because an adhesive is commonly employed, upon driving a fastener, a certain amount of the adhesive will tend to be subjected to the force of the driver. It is common that the adhesive will largely remain attached to the fastener and be driven into the workpiece. It is possible, however, that fragments of the adhesive will become detached, with the potential for scattering of the loose fragments about a work site. Another phenomena is known as "flagging", and involves the tendency of pieces of adhesive to separate from fasteners during driving, and becoming lodged in the workpiece, but protruding outwardly from the insertion point, causing the workpiece under construction to have a potentially less pleasing appearance.

Practical requirements also impose design constraints upon fastener assemblies. For example, experience has shown a preference for any structures for carrying fasteners to have an adhesive layer thickness less than about 100 μm. Transport and handling considerations have favored relatively light weight materials. Of course, as gleaned from the above, these must be considered in light of the mechanical properties desired of the materials, such as appropriate tear resistance, stiffness or otherwise.

As can be seen, for the successful manufacture and use of a fastener assembly, such as a nail strip, there are a surprisingly large amount of potentially competitive design considerations. The mere selection of any adhesive to satisfy each of the above needs is extremely difficult, let alone the optimization of the properties of any such adhesive for the specific intended use. It would therefore be valuable to have an improved structure by which at least some, if not all of, the above needs can be met.

Other publications of potential interest to the teachings herein are U.S. Pat. No. 7,198,446 and Published U.S. Application No. 2003/0087996 (both incorporated by reference).

SUMMARY OF THE INVENTION

The present invention contemplates a fastener assembly, and particularly a multi-layered strip assembly that exhibits (as compared with existing assemblies) improvements in one or more characteristics, such as increased rigidity, greater ability to resist bending and buckling (e.g., for permitting rapid loading into a tool), good fastener carrying properties (e.g., good adhesion characteristics), decreased resistance to tearing, without increasing the amount of material, or any combination of the foregoing.

In one respect, the fastener assembly (e.g. nail assembly) of the invention differs from the shape and configuration previously known in that the invention makes use of a multi-layered strip structure (and particularly a multi-layered tape) comprising at least two polymeric layers, and specifically a first polymeric layer that effectively forms at least one surface for engagingly contacting a plurality of fasteners, and being formed from an extrudable first polymeric composition and 2) a second layer formed from a filled polymeric composition. The first polymeric layer composition generally will include an extrudable polymeric backbone reacted with a polar functional moiety and provides good adhesion to the fastener. The second polymeric layer generally will include a polymeric composition filled with from about 3% to about 75% particulate filler material, based on the weight of such polymeric composition. The particulate filler material of the second polymeric layer may include an organic filler, an inorganic filler, or even a mixture of an organic and inorganic filler.

The use of multiple layers in the structure of the tape enables increased design freedom, by the ability to selectively employ individual layers with different characteristics, as contrasted with employing single layer structures with generally homogeneous characteristics in the layer. See, e.g., U.S. Pat. No. 5,733,085, incorporated by reference. As an example, the first polymeric layer can be designed to have a low melting temperature or a low activation temperature for ease of bonding to the fasteners (and thus low energy requirements for bonding), using a polymeric composition having low modulus or low stiffness. Such low modulus polymeric compositions would typically be undesirable for keeping the fastener assembly in a rigid shape. However, in the present invention, the one or more other layers can provide the necessary stiffness for the fastener assembly.

These and other features and advantages of the invention will become further apparent from the following detailed description of the presently preferred embodiments, read in conjunction with the accompanying examples and drawings. The detailed description, examples and drawings are intended to be illustrative rather than limiting, with the scope of the invention being defined by the appended claims and equivalents thereof.

DETAILED DESCRIPTION OF THE PRESENTLY PREFERRED EMBODIMENTS

The present invention is directed to improvements in the manner of carrying a plurality of fasteners in a common strip, such as in a fastener assembly that provides a supply of fasteners to a driving tool, and specifically a power driving tool such as a nail gun, stapler, or a screw gun. In one respect, the invention is directed particularly at a novel strip structure and a process for making the strip structure. In another respect, the invention is directed to an assembly that includes a plurality of fasteners that are carried by the strip. The present invention also contemplates processes of making the strip and fastener assembly, as well as using them, and the assemblies resulting from the use of the fasteners carried by the strip or fastener assembly.

More specifically, the present invention contemplates a multi-layered strip for carrying a supply of fasteners for delivery to a driving tool, including (a) a first polymeric layer (e.g., one that includes a filled or unfilled adhesive with a thermoplastic polymeric backbone, such as a polyolefinic-containing backbone) having a first surface for contacting the fasteners and a second surface and including a polymer with at least one polar moiety; and (b) a second polymeric layer [e.g., a polymeric layer including a filler (and in one specific embodiment, a filler that generally is reactive with the polar moiety of the first polymeric layer) in an amount up to about 75% by weight of the layer (e.g., about 3 to about 45%, or more specifically about 8 to about 35% by weight)] disposed on the first polymeric layer on the second surface (e.g., over the second surface and possibly even in direct contact with the second surface), the second polymeric layer being sufficiently rigid for reinforcing the first polymeric layer. The at least one polar moiety includes a component selected from the group consisting of unsaturated carboxylic acids; functional derivatives of carboxylic acids including anhydrides, esters and amides; metal salts of unsaturated carboxylic acids; imides; and mixtures of the foregoing. For example, one particular approach is for the at least one polar moiety to include maleic anhydride. It is also possible that the second polymeric layer will also include a polar moiety, as described. For such instances, it is desired that the concentration of the polar moiety in the second polymeric layer will be less than the concentration of polar moiety in the first polymeric layer.

In general, the strip will be prepared so that the first polymeric layer and the second polymeric layer are in direct contact with each other over at least a portion of the length of the strip, and in a particular respect, they will be in direct contact with each other throughout substantially the entirety of the length of the strip. The first layer, the second layer, or both, generally will have a substantially constant thickness over its receptive length. The total weight of the second polymeric layer may be greater than the weight of the first polymeric layer; the thickness of the second layer may be greater than the thickness of the first polymeric layer; or both. For example, the thickness of each of the first layer and the second layer may be substantially constant over its length, and the ratio of the thickness of the first layer to the second layer will range from about 1:25 to about 3:1, and more specifically from about 1:9 to about 2:1. By way of example, the thickness of the first polymeric layer may be less than about 100 μm, or even less than about 60 μm.

In one embodiment of the invention, the filler of the second polymeric layer of the strip will desirably include a fiber derived from a bio-mass source, a particulate derived from a bio-mass source, or a combination thereof. More specifically, it is desirable that (a) the filler includes a finely divided filler selected from natural fibers, food processing waste, timber by-products, or any combination thereof; (b) the filler of the filled polymeric composition is reactive with the at least one polar moiety of the first polymeric layer; or (c) any combination of (a) and (b). For example, the filler of the second polymeric layer may include a filler selected from the group consisting of wood flour, ground rice hull, ground husks, ground nut shells, ground fruit pits, kenaf particles, sago particles, jute particles, and any combination thereof. The filler may be prepared by one or more grinding steps, optionally in combination with a step of calcination, freeze drying or both. Thus, the filler may include at least one ash derived from calcination, freeze drying or a combination thereof. The filler of the second polymeric layer may include a mixture of an inorganic filler and an organic filler. For example, the filler of the second polymeric layer may include a mixture of an inorganic filler with an organic filler selected from the group consisting of wood flour, ground rice hull, ground husks, ground nut shells, ground fruit pits, kenaf particles, sago particles, jute particles, and any combination thereof.

As indicated the polymer backbone of the first polymeric layer will comprise a thermoplastic material, and more specifically one selected from the group consisting of polyethylene, polypropylene, copolymers of ethylene with other alpha-olefins, copolymers of propylene with other alpha-olefins, copolymers of ethylene with ethylenically unsaturated esters and their derivatives, and any combination thereof. Optionally, the first polymeric layer may comprise up to about 40% inorganic filler by weight of the total first polymeric layer. A particularly attractive polymer for inclusion in the first polymeric layer comprises an ethylene homopolymer or at least one copolymer of ethylene, and has maleic anhydride present in an amount of at least about 0.03% by weight of the first polymeric layer, preferably at least about 0.05% by weight of the first polymeric layer.

For the fastener assemblies of the present invention, a plurality of fasteners are typically contacted with at least the first polymeric layer (e.g., contacted with an exposed surface of the first polymeric layer, at room temperature or at an elevated temperature) and oriented in a desired orientation. For example, the fasteners may be oriented generally at an angular incline relative to the transverse axis of the strip (e.g., the longitudinal axis of the shank of each fastener is oriented about 10 to about 50° relative to the transverse axis (the direction of which is denoted by the arrow of "C" in FIG. 1) of the strip); spaced substantially equidistant relative to each other; substantially parallel relative to each other; or any combination thereof. It is possible that the fasteners rest on or be at least partially recessed within the first polymeric layer. Another approach is to form a sandwich structure by which the fasteners reside on or at least partially within the first polymeric layer and an additional layer covers the fasteners in contact with either or both of the fasteners or the first polymeric layer. One specific approach is to employ as the additional layer another strip in accordance with the teachings herein. For example, the additional strip may include a) a first polymeric layer (e.g., one that includes a thermoplastic polymeric backbone, such as a polyolefinic-containing backbone, and which optionally may include a filler, such as an inorganic filler in an amount up to about 40% inorganic filler by weight of the total first polymeric layer) having a first surface for contacting the fasteners and a second surface and including a polymer with at least one polar moiety; and (b) a second polymeric layer (e.g., a polymeric layer including a filler in an amount up to about 75% by weight of the layer (e.g., about 3 to about 45%, or more specifically about 8 to about 35% by weight) disposed on the first polymeric layer over the second surface, the second polymeric layer being sufficiently rigid for reinforcing the first polymeric layer.

For making the strips and fastener assemblies according to the teachings herein, one way to achieve such a structure is to extrude a profile that includes the first polymeric layer and the second polymeric layer (e.g., co-extruding or otherwise joining the first polymeric layer with the second polymeric layer, such as by employing in the step of joining (e.g., by co-extruding) a step selected from extrusion coating, cast film extruding, blown film extruding or any combination thereof). One process may include a step of extrusion coating one layer onto a backing layer, and then extrusion coating another layer thereon, e.g., in-line or as a secondary operation.

To facilitate handling, the strip optionally may include a suitable backing layer, such as a film or a paper layer, over at least a portion of the length of the strip. For example, a backing layer may be employed over an exposed surface of a layer of the strip that is most remote from the fasteners.

Of course, other processes to make the structures may be employed, such as lamination processes or otherwise. Further, it is possible that there may be included within the assemblies herein one or more additional polymeric layers (e.g., a third polymeric layer that is the same as or differs from the first polymeric layer, the second polymeric layer or both). For example, a third polymeric layer may be employed that includes an extrudable polymeric backbone which has been reacted with a polar moiety, and wherein the third polymer layer is substantially free of contact with the first polymeric layer.

As seen from the above, it is thus possible to realize a multi-layered adhesive structure (e.g., a multi-layered tape) bonded to a plurality of fasteners and maintaining them in the substantially parallel arrangement in the row; wherein the multi-layered adhesive structure comprises: (a) a first surface layer (i.e. first polymeric layer) formed from an extrudable first adhesive composition, such as one that comprises the first polymeric layer; wherein the first adhesive composition comprises an extrudable polymer backbone which has been reacted with a polar moiety; and (b) a second layer formed from an extrudable filled polymeric composition, which provides stiffness to the fastener assembly; wherein the filled polymeric composition comprises in an amount up to about 75% of a particulate filler based on the total weight of the filled polymer composition.

For example, one such fastener assembly may include a plurality of fasteners sandwiched between two opposing multi-layered structures, with each one including (a) a first surface layer (i.e. first polymeric layer) formed from an extrudable first adhesive composition; wherein the first adhesive composition comprises an extrudable polymer backbone which has been reacted with a polar moiety; and (b) a second layer formed from an extrudable filled polymer composition which provides stiffness to the fastener assembly; wherein the filled polymer composition comprises from about 3 to about 75% of a particulate filler based on the total weight of the filled polymer composition.

Figure 1:
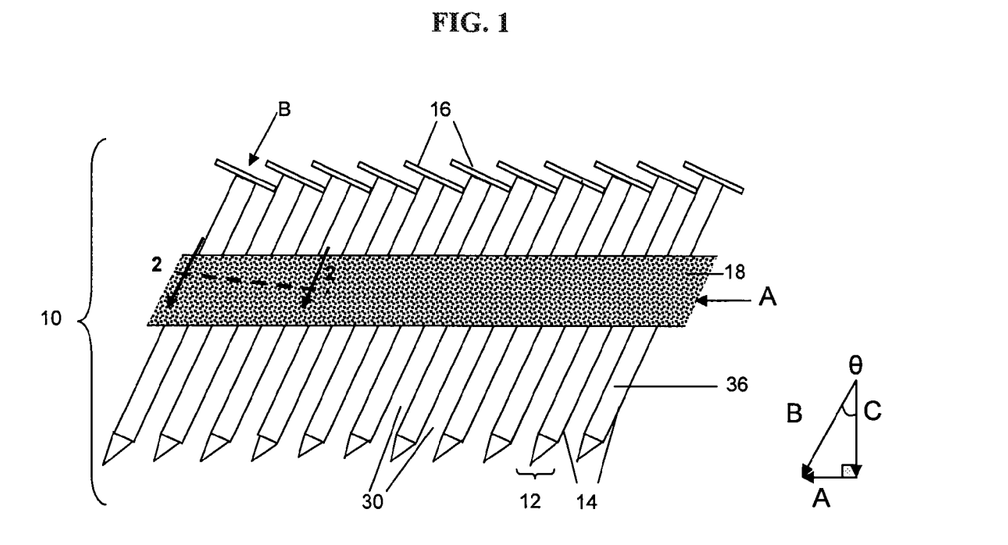
FIG. 1 is a top plan view of a section of an illustrative fastener assembly (e.g., a nail strip) according to one embodiment of the invention.
Figure 2:
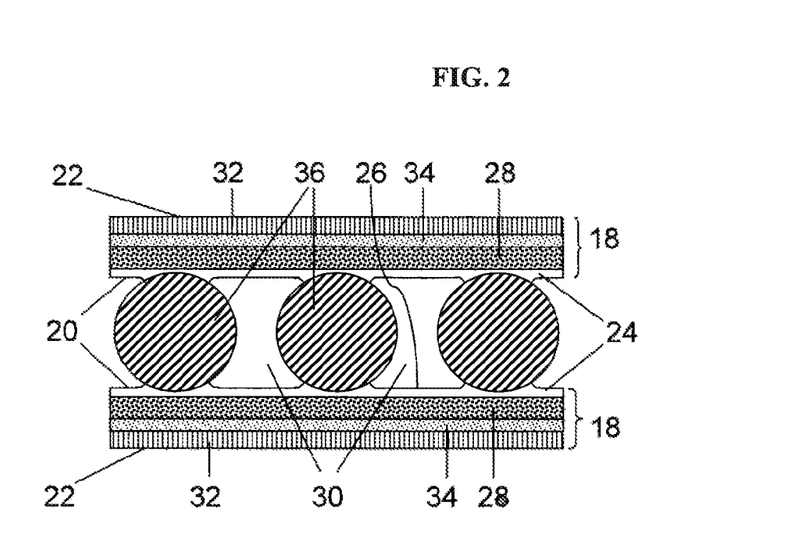
FIG. 2 is a sectional view of the assembly of FIG. 1, taken along the line 2-2 in FIG. 1.

By way of further illustration, reference is made to FIGS. 1 and 2, wherein there is illustrated one example of a fastener assembly according to the present teachings. Though illustrating a total of 11 fasteners, the skilled artisan will appreciate that the invention is not to be so limited. A complete assembly may contain fewer or more fasteners, with as many as 12, 20, 40, 100 or even more fasteners. Further, though illustrated with reference to nails, other fasteners may be substituted for the nails, in accordance with the teachings herein. Thus, the drawings are not to be limited to the embodiments shown.

There is a trend in the construction industry toward the use of higher speed power drivers, such as nail guns which 1) inject individual nails into wood at a faster pace, and 2) move a fastener assembly 10 (e.g., a nail strip) forward in the magazine of the tool (not shown) more rapidly so that individual fasteners 12 (e.g., nails) can be injected more frequently, with lower cycle times. To move a fastener assembly forward in a magazine, pressure is applied in the direction of the arrow A shown in FIG. 1 (generally in the longitudinal axis direction of the assembly). To introduce a tip end 14 of each fastener into a workpiece (e.g., lumber, particle board, plywood, laminate, sheet metal, or otherwise), a driving force is applied at a head 16 of each fastener, generally in the direction as shown by the arrow B.

The velocity at which fasteners are advanced within the driving tool, and hence the velocity of the fastener assembly as it passes into the magazine can be controlled by the pressure at A, (e.g., the pressure can be increased to increase the velocity). The present invention is premised at least in part upon the recognition that, when the pressure and velocity are increased, there is an increased tendency toward bending and buckling of the fastener assembly, which potentially causes undesirable misalignment of the nails before they reach position B. It is believed that the materials employed according to the teachings herein will help to foster alleviation of the restrictions heretofore placed upon adhesive layer thickness, fastener spacing, or both.

The assembly 10 is shown to include at least one generally flat strip 18, which may include substantially parallel opposing surfaces 20 and 22. It is also possible they may have grooves, such as is shown in U.S. Pat. No. 7,198,446 (incorporated by reference). The strip shown in the drawings herein has generally parallel and straight edges. However, the strip may optionally include one or more notches along the edges, such as is shown in U.S. Pat. No. 7,198,446 (incorporated by reference). The strip optionally may include a plurality of perforations.

Nails are positioned substantially parallel to each other. In the embodiment shown in FIG. 2, there are two opposing strips 18, with each one depicted as similar to each other. Of course, it is possible to omit one of the opposing strips. It is also possible to have the opposing strips be different relative to each other (e.g., in composition, thickness, number of layers, or any combination of the same). At least one of the strips 18 includes a multi-layered tape that contacts the nails using a first polymeric layer 24, (namely a layer that defines a first surface 26 formed of a first adhesive composition). One or more of the strips may also include a second polymeric layer 28 that preferably will include a second layer formed from a filled polymer composition. The strips of the multi-layered adhesive tapes will hold the nails in a predetermined configuration, such as a parallel configuration with spaces 30 between the nails. In the preferred embodiment shown, the row of nails is bonded on one side to a first strip (specifically, a first multi-layered tape) and is bonded on an opposite or reverse side to a second strip (specifically a second multi-layered tape). The strips can also contain one or more backing layers 32. For example, the backing layer may be a thin member, such as derived from a paper or a film (e.g., comprising a brittle plastic). The backing layer can be used to reinforce the multi-layered adhesive tapes, as a substrate used for printing, labeling or both. One example of a preferred backing layer is kraft paper, which is strong and tends to blend in with the color of the workpiece being penetrated by the fastener. Preferably, the backing layer is carried on the surface of the multi-layered adhesive tape of the strip that is furthest from the row of fasteners.

The multi-layered tapes optionally can have additional polymeric layers, e.g., a third polymeric layer 34, such as a third layer that overlies the second polymeric layer 28. In one embodiment of the invention, the third layer 34 has the same composition as the first polymeric layer 24. In another embodiment, the third polymeric layer 34 has a composition that is different from that of the first polymeric layer. In FIG. 2, the first layer (formed from the first adhesive composition), the second layer (formed from the filled polymer composition), the third polymeric layer, and the backing layer form a multi-layered adhesive tape where the third polymeric layer bonds each backing layer 32 to the second polymeric layer 28. Although FIG. 2 identifies a multi-layered adhesive tape having three polymeric layers, the use of more than three polymeric layers may be beneficial. For example, without limitation, additional layers including rework or scrap material, or layers having different mechanical properties can be used.

Each of the fasteners has a head 16 and a shank 36. As shown in FIG. 1, the heads 16 of adjacent nails partially overlap each other. Furthermore, the head 16 of each leading nail can touch the shank 36 of the closest trailing nail, in order to help maintain the alignment of the nails.

The nails are slanted relative to a transverse axis of the multi-layered adhesive tapes as shown in FIG. 1. The angle of slanting (θ) of the nails is between about 10-50 degrees, preferably about 15-35 degrees, where a zero degree slant is perpendicular to the longitudinal axis the adhesive tape. This slanting helps permit the heads to overlap when the nails are in uniform parallel alignment. By overlapping the heads, the distance between the adjacent nail shanks can be made less than would be required if the nails were aligned perpendicular to the longitudinal axis of the adhesive tape with the respective head portions positioned edge to edge. The distance between adjoining shanks can be further reduced by providing the heads with a truncated shape (e.g. a half circle or three-quarter circle with a flat edge) instead of making them completely round, or by offsetting the nail head on the shank. One approach is to employ both slanting of the fasteners in combination with a truncated shaped head.

The nails (or other fasteners) can be constructed of any metal commonly used for fasteners, including steel, copper, aluminum, zinc and various other metals and metal alloys. As explained below, the first adhesive composition employs a polar functionality which chemically reacts with a thin oxide coating appearing on the surfaces of most metals. Therefore, any metal or alloy which forms an oxide on its surface, and which is suitable for fasteners, can be employed in the fasteners in this invention. The fasteners optionally may be plated or otherwise surface treated.

One or more of the polymeric layers of the strips described herein will be selected to have adhesive characteristics, and may include or consist essentially of a filled or unfilled adhesive composition.

By way of further illustration, the first polymeric layer generally will include or consist essentially of a filled or unfilled first adhesive composition. Such adhesive composition generally will include as a primary functional ingredient an extrudable polymeric material, which includes or consists essentially of a polymer or copolymer backbone which has been grafted or otherwise reacted with a polar monomer to impart a polar functionality to the adhesive. Suitable polymer backbones include thermoplastic materials such as polyethylene (especially high density polyethylene), polypropylene, copolymers of ethylene with other alpha-olefins (for example, linear low density polyethylene), copolymers of propylene with other alpha-olefins, copolymers of ethylene with ethylenically unsaturated esters and their derivatives (for example, ethylene vinyl acetate), and mixtures including any of these polymers. Of these, the more rigid polymers are preferred including linear low density polyethylene, high density polyethylene and polypropylene. Most preferably, the rigid polymer includes or consists essentially of polyethylene.

Typical functional moieties which can be reacted with the polymer backbone to impart polarity include (without limitation) unsaturated carboxylic acids; functional derivatives of the carboxylic acids including anhydrides, esters, and amides; metal salts of unsaturated carboxylic acids; imides; and mixtures of the foregoing. Of these, maleic anhydride is especially preferred. The maleic anhydride or other functional moiety can be thermally grafted, copolymerized or otherwise reacted onto the polymer backbone at a concentration of about 0.01-15% by weight of the polymer backbone, preferably about 0.1-8% by weight of the polymer backbone, most preferably about 0.2-4% by weight of the polymer backbone. Overall, the active ingredient (defined as polyolefin reacted with functional moiety) constitutes about at least 1% by weight of the first adhesive composition, with preferred amounts varying depending on the amount and type of the functional moiety reacted with the polymer backbone.

In one embodiment of the invention, the extrudable polymer backbone of the first polymeric layer includes a homopolymer or copolymer of ethylene having at least about 0.05% by weight of the polymer of maleic anhydride.

Examples of suitable materials for use in the first polymeric layer include (without limitation) resins prepared by copolymerizing acrylic acid with ethylene; graft-modified polyolefins blended with hydrocarbon elastomers; an anhydride-modified high density polyethylene; a chemically modified linear low density polyethylene; chemically modified high density polyethylene-based resins; chemically modified and rubber modified high density polyethylene-based resin; chemically modified polyolefins (e.g., anhydride modified polymers based on ethylene terpolymers of butyl acrylate and carbon monoxide; anhydride modified polymers based on ethylene vinyl acetate copolymers; anhydride modified polyethylenes; anhydride modified polyethylene copolymers; anhydride modified polymers based on polypropylene or polypropoylene copolymers; a polar moiety-containing high density polyethylene adhesive; or any combination thereof.

Examples of commercially available extrudable polymers having backbones that have been reacted with a polar moiety, which can be employed include PRIMACOR®, which is a family of low modulus, low density resins prepared by copolymerizing acrylic acid with ethylene and available from Dow Chemical Co.; graft-modified polyolefins blended with hydrocarbon elastomers, as described in U.S. Pat. No. 4,198,327 (incorporated herein by reference); BYNEL®CXA, which is an anhydride-modified high density polyethylene available from E.I. du Pont de Nemours, Inc. ("DuPont"); BYNEL®E205, which is a chemically modified linear low density polyethylene available from DuPont; ADMER®NF500 and NF550, which are chemically modified high density polyethylene-based resins available from Mitsui Petrochemical Industries (Tokyo, Japan); PLEXAR® which is a family of chemically modified and rubber modified polyethylene-based resin available from Lyondell Chemical Company (Houston, Tex.); IGETABOND®E and G, which are chemically modified polyolefins available from Sumitomo Chemical Co. of Osaka, Japan, FUSABOND® A (DuPont) which is a series of anhydride modified polymers based on ethylene terpolymers of butyl acrylate and carbon monoxide, FUSABOND® C (DuPont) which is a series of anhydride modified polymers based on ethylene vinyl acetate copolymers, FUSABOND®E which is a series of anhydride modified polyethylenes, FUSABOND®N which is a series of anhydride modified polyethylene copolymers, FUSABOND® P which is a series of anhydride modified polymers based on polypropylene or polypropoylene copolymers, and TYMOR®, which is a polar moiety containing high density polyethylene adhesive available from Rohm and Haas. One very useful extrudable adhesive is PLEXAR®PX3236, a polyethylene adhesive sold by Lyondell Chemical Company (Houston, Tex.).

Polyolefins can be modified with unsaturated acids or acid anhydrides by various grafting processes, such as grafting high density polyethylene with unsaturated bridged dicarboxylic acid anhydrides (as taught for example, by U.S. Pat. Nos. 4,087,587, 4,087,588, and 4,298,712, each of which is incorporated herein by reference). One acceptable technique involves grafting acrylic acid moieties on gamma irradiated low-density polyethylenes to produce adhesives for metals.

The first polymeric layer composition used in the invention may optionally contain a particulate filler which stiffens and rigidifies the adhesive. Although any of the fillers listed below for the filled polymer composition can also be used for the first adhesive composition, those fillers which react with the polar moiety of the active ingredient should be used sparingly or preferably avoided altogether for avoiding potentially deleterious undesired reactions. In one embodiment of the invention, the first polymeric layer may comprise up to about 0.5% to about 40% inorganic filler by weight of the total first polymeric layer. If used, the filler is preferably a filler (or mixture of fillers) that does not react with the polar moiety of the active ingredient and more preferably the filler is talc. For one preferred embodiment, the first polymeric layer will be present in a minor amount of the overall resulting multi-layered strip structure. In this component of the multi-layered strip, the use of filler, though advantageous, is not necessary to produce a structure having the desired balance of high stiffness and low tear resistance. Accordingly, the selection of ingredients for the first polymeric layer composition can be directed primarily toward optimizing the ability of the material to wet and bond to the fasteners.

In one embodiment of the invention, the polymeric ingredient in the first polymeric layer composition has a relatively low melting point which reduces the temperature for bonding the layer to the fastener. The peak melting temperature, as measured using differential scanning calorimetry according to ISO 11357-3 (1999), at a heating rate of 20° C./min, is preferably less than about 135° C., more preferably less than about 125° C., and most preferably less than about 100° C.

The first polymeric layer composition may optionally contain one or more additional thermoplastic polyolefin-type polymers and copolymers which are not reacted with a polar functional moiety. The unreacted polymer may simply serve as a diluent for the reacted polymer, and may include any of the polymers listed above as polymer backbones. The unreacted polymer may also serve as an adhesion promoter, and may include soft or rubbery materials such as ethylene-propylene rubber, butene-1 polymers and copolymers, ethylene vinyl acetate, and other soft materials. When used, the optional additional polymer or polymers is preferably less than about 98% by weight of the composition.

Whether or not an unreacted polymer is used in the first polymeric layer composition, and how much, will depend on the strength and amount of the polar functional moiety reacted with the backbone polymer in the active ingredient (which affects how much, if any, the active ingredient can be diluted). Also meriting possible consideration are the type and level of filler used (which affects how much, if any, the filler interacts with the active ingredient). Generally, the amounts and types of the active ingredient, filler and unreacted polymer (if any) should be selected so that the amount of the functional polar moiety, which is available for chemically bonding to the metal oxide surface of the fasteners (i.e. which is not reacted with the filler) constitutes about 0.01-1.5% by weight of the overall adhesive composition. Preferably, the amount of the polar functional moiety will be about 0.02-1.0% by weight of the composition, most preferably about 0.03-0.50% by weight.

It is generally contemplated that the stiffness of strips herein will be derived largely, if not predominantly from the second polymeric layer (e.g., a filled thermoplastic composition) and the other optional components. Thus, the first polymeric layer can be a relatively thin layer, or even occupy only a minor portion of the overall thickness of the resulting strips. For example, the thickness of the first polymeric layer (e.g., a layer formed from a first adhesive composition) is preferably less than about 100 µm, more preferably less than about 75 µm, and most preferably less than about 50 µm. Likewise, if a third polymeric layer is employed, such as described above, it may have a similar thickness. The first polymeric layer (or any optional third layer) is preferably less than about 35% by weight based on the total weight of the strip, more preferably less than 25% by weight, and most preferably less than 20% by weight.

Suitable polymer backbones for the filled thermoplastic composition (such as the composition that will be found in the second polymeric layer) are contemplated to include thermoplastic materials such as polyethylene (especially high density polyethylene), polypropylene, copolymers of ethylene with other alpha-olefins (for example, linear low density polyethylene), copolymers of propylene with other alpha-olefins, copolymers of ethylene with ethylenically unsaturated esters and their derivatives (for example, ethylene vinyl acetate), and mixtures including any of these polymers. Of these, the more rigid polymers are preferred including linear low density polyethylene, high density polyethylene and polypropylene.

One or more of the filled thermoplastic compositions used in the invention may optionally include, as a minor component, an ingredient based on an extrudable polymer or copolymer backbone which has been grafted or otherwise reacted with a polar monomer to impart a polar functionality. Any of the polymers containing polar functionality which are acceptable for the first polymeric layer can also be used in the filled thermoplastic composition. If employed, such polymers will be employed at a reduced concentration as compared with the concentration for the first polymeric layer. For example the filled thermoplastic composition may contain enough polar functional moieties to adhere to the optional backing layer, but not enough to give good adhesion to the fastener. If employed, the concentration of polar moiety in the filled thermoplastic composition of the second polymeric layer should preferably be less than the concentration of polar moiety in the first polymeric layer.

The filled thermoplastic composition useful in the second polymeric layer used in the invention also contains a particulate filler which stiffens and rigidifies the adhesive. The particulate filler can be inorganic or organic, and can constitute about 3-75% by weight of the total adhesive composition, preferably about 6-45% by weight, most preferably about 10-20% by weight. The filler particles should have a mean particle diameter of about 0.1-100 microns, preferably about 0.5-75 microns, most preferably about 1-10 microns. Particle size will generally be selected so that the compositions are readily extrudable, and are capable of good dispersion within the polymeric compositions of the layers.

Particulate inorganic fillers useful herein (in either or both of the first or the second polymeric layers) include, but are not limited to, talc, mica, alumina, wallastonite, clay (e.g., including nanoclay), glass spheres, glass powder, silica, titanium dioxide, barium sulfate, saponite, montmorillonite, aluminum hydroxide, zinc oxide, magnesium hydroxide, calcium hydroxide, fly ash, barium titanate, calcium titanate, carbon black, calcium carbonate, diatomaceous earth, and mixtures thereof. The clays that may be used as fillers may include clays from the kaolinite, illite, chloritem, smectite or sepiolite groups, which may be calcined. The clays may also include minor amounts of other ingredients such as carbonates, feldspars, micas, and quartz. Also, the inorganic filler may be treated with a silane coupling agent or an organic acid such as stearic acid. In one approach, the extrudable filled polymer composition comprises a particulate inorganic filler selected from the group consisting of talc, calcium carbonate, clay, and mixtures thereof.

Examples of particulate organic fillers include, without limitation, wood flour, ground rice hull, ground husks, ground nut shells, ground fruit pits, kenaf particles, sago particles, jute particles, or any combination thereof.

In one approach, the extrudable filled polymer composition comprises an organic filler selected from the group consisting of wood flour, ground rice hull, ground husks, ground nut shells, ground fruit pits, and mixtures thereof. For example, the filler of the extrudable filled polymer composition comprises an organic filler selected from the group consisting of wood flour, ground rice hull, and mixtures thereof.

In one embodiment of the invention, the filler may include a mixture of an organic filler and an inorganic filler. As an example, the filler may include a mixture of an organic filler and talc. As another example, the filler may include a mixture of an inorganic filler with wood flour. In a more specific example, the filler comprises or even consists essentially of a mixture of wood flour and talc.

In one approach, the filled polymer composition for use in the second polymeric layer will include from about 3% to about 45% organic filler by weight of the total layer, and more specifically, from about 8% to about 35% organic filler by weight of the total layer.

In one embodiment of the invention, the second polymeric layer includes a filler that is reactive with the polar moiety of the first adhesive composition.

For the polymeric compositions herein, one or more additives may be employed for improving the performance of the material, such as (without limitation) a thermal stabilizer, a light stabilizer, a flame retardant, a lubricant, or otherwise.

Preferably, the thickness of the second polymeric layer is greater than the thickness of the first polymeric layer.

The multi-layered strips of the present invention may also contain a third polymeric layer which is disposed remotely from the fasteners. Such a layer would find utility in bonding an optional backing layer to a different layer of the tape. The third polymeric layer itself may function as a backing layer.

In one embodiment of the invention, the third polymeric layer bonds the backing layer to the filled polymer composition. In one embodiment, this third polymeric layer can be formed of a composition that is the same as the composition of the first polymeric layer. In another embodiment, this third polymeric layer is formed of an adhesive composition that differs from the composition of the first polymeric layer. Thus, if utilized, the third polymeric layer may be formed from a composition which comprises an extrudable polymeric backbone which has been reacted with a polar moiety. Preferably, the second polymeric layer is located between the first polymeric layer and the third polymeric layer, and maintains the first and the third polymeric layers spaced apart from each other over at least a portion, if not substantially the entirely of the length of the strip.

Additional layers or components may further be used in the multi-layered structures herein. For example, additional filled polymer compositions or layers of recycled material may be used. If any of these are employed, they should be employed in sufficient amounts and exhibit sufficient properties such that they will not significantly increase the tear resistance or decrease the stiffness of the multi-layered adhesive tape.

Optionally, one or more additive may be added to the compositions of any of the layers. Such additives may include one or any combination of heat stabilizers, process aids, process stabilizers, flow modifiers, colorants, dispersion aids, light stabilizers, or diluents. Selection of the additives and concentration will depend on many factors including the polymers employed, the processing conditions, and the desired properties and appearance. Nevertheless, through reasonable experimentation following the teachings herein, the skilled artisan should be able to determine the appropriate additives and additive concentrations for any particular application.

Multi-layered structures (e.g., tapes) of this invention may be prepared by any convenient means. In one preferred procedure, the structures according to the teachings herein are first extruded in their molten state onto a backing layer, and allowed to cool. This extrusion coating can be a co-extrusion of the different layers or by the multiple extrusion of individual layers (commonly referred to as multiple 'bumps', e.g. double bump, triple bump etc.) directly onto the backing layer. If no backing layer is used, the process can include a co-extrusion process such as a cast extrusion process or a blown film process.

In order to provide sufficient stiffness to the fastener assembly, the total thickness of the strip is preferably at least about 100 μm, and more preferably at least about 150 μm. For example, the total thickness of the strip including any optional layers, may range from about 100 to about 600 μm, more preferably from about 125 to about 400 μm, and most preferably from about 150 to about 350 μm.

Fastener assemblies of this invention may be prepared by any convenient means. In one embodiment of the invention, a fastener assembly is fabricated by heating a plurality of substantially identical shanked fastener members (as above described) to a temperature in the range where the first polymeric layer is softened and where the polar functionality of the composition within the first polymeric layer is either chemically activated, caused to become more fluid for enabling it to migrate and wet the fastener surface, or both. Each heated fastener is impressed transversely and uniformly into the first polymeric layer of the strip. Each adhered shank is thus in the preferred spaced, parallel, aligned relationship with the shanks of adjacent fasteners, as described above particularly in reference to FIG. 1.

The impressing procedure characteristically may produce a raised region of the first polymeric layer on either side of the shank of each nail or fastener with the layer thereby becoming bonded to each fastener member in regions of contact. One approach is to prepare preliminarily a group of nails which are all held in a spaced, parallel aligned relationship to one another and which are all substantially uniformly heated prior to impressing them individually, or as a group into the strip.

Heating levels and mounting pressures applied to the fasteners vary depending upon many variables such as nail size, characteristics of the polymeric layers of the strip, extent of bonding desired between individual fasteners and the first polymeric layer, nature of the fasteners, optional layers (including any backing layer), and the like. Exact heating and pressing conditions applicable to a particular fastener should be readily determinable by reasonable experimentation to those skilled in the art for any particular application in view of the teachings contained herein.

A fastener assembly made in accordance with the present invention offers a combination of unique properties and advantageous characteristics. For example, following the teachings herein, the present invention could provide for an assembly with reduced tear resistance, increased modulus and less bending and buckling during use.

The following examples illustrate the expected benefits of the present invention, particularly as compared with existing conventional materials in the art.

EXAMPLES

Multi-layered structures according to the invention are prepared by co-extruding the first and second polymeric layers into a common film die. Using this process, a three layered blown film is prepared having skin layers (layer 1 and layer 3) of the first polymeric layer composition and a core layer (layer 2) of the second polymeric layer composition (i.e., a filled thermoplastic composition) in the center layer. The thickness of the film is 200-500 μm.

A Control 1 sample is prepared by co-extruding a structure that includes only the first polymeric layer in each of layer 1, layer 2, and layer 3. No filled thermoplastic composition, as described herein for the second polymeric layer, is employed in the control. The first polymeric layer in Control 1 contains 50 wt. % Plexar PX3236, 20% HDPE-1, and 30% of a Talc Masterbatch (50% talc; 50% HDPE-2). Plexar PX3236 is a linear low density polyethylene containing maleic anhydride grafted onto a polyethylene backbone with a melt index of 2 and a specific gravity of 0.92. The HDPE-1 is a high density polyethylene with a specific gravity of 0.96 and a melt index of 0.9. The Talc Masterbatch is a blend of 50% talc and 50% HDPE-2, the masterbatch having a melt index of 19.6 g/10 min, measured at 190° C., 2.16 kg, and a specific gravity of 1.4.

The Control 2 sample is made with layers 1 and 3 formed from the same first polymeric layer composition as Control 1. The core layer (layer 2) of Control 2 sample is neat HDPE-1. The speeds of the extruders are selected such that the thickness of the layer 2 is approximately 70% of the total and the thickness of layers 1 and 3 are each approximately 15% of the total thickness.

Examples 1-5 are prepared with layers 1 and 3 formed from the same first polymeric layer composition as Control 1 and Control 2. Examples 1-5 each contain different filled thermoplastic compositions for layer 2 (core layer). The filler in these examples is one of the following: the Talc Masterbatch previously described, a Wood Flour Concentrate (containing 50% by weight of the concentrate of 200 mesh maple wood flour in high density polyethylene, and having a melt index of 15.9 g/10 min, measured at 190° C., 9.9 kg), or a blend of the Talc Masterbatch and the Wood Flour Concentrate. All of the Examples are co-extruded to have about 15% thickness each of layers 1 and 3 (skin layers) and 70% of layer 2 (core layer). TABLE 1 lists the formulations of the different layers for Controls 1-2 and Examples 1-5. TABLE 1 also shows the relative thicknesses of the three layers.

Mechanical testing is performed on the samples using a Tinius Olsen H5K-S Universal Testing Machine. Specimen having thickness of approximately 200 μm are used to measure the Young's modulus and the tear resistance. The Young's Modulus is measured in tension using specimen with a width of 25.4 mm, a length of 50.8 mm, and a cross-head speed of 25 mm/min. The units for the modulus are MPa. The tear resistance is measured using trouser tear specimen having a width of 63.5 mm and a length of 63.5 mm. A 25.4 mm cut is made starting from the center of one edge of the sample towards the center of the specimen, in order to make the "legs" of the trouser. The trouser tear specimen is torn at a cross-head speed of 500 mm/min. The tear resistance is determined by dividing the energy to tear the specimen by the tear area. The tear area is estimated as 2×d×t, where t is the thickness of the specimen and d=0.0381 m. The units for the tear resistance are $kJ/m^2$. The tear resistance is measured in the transverse direction (TD) on these blown film specimen. Five specimens are tested for each sample and the average values are given in TABLES 1 and 2.

Table 1 shows how the tear resistance decreases and the modulus increases for Examples 1-5 compared with Controls 1-2. Indeed a desirable performance (low tear resistance and high modulus) is expected to occur when the core layer contains high concentrations of the Wood Flour Concentrate.

Control 3 is prepared similar to Control 2, except the first polymeric layer composition (layer 1 and layer 3) contains no filler and the concentration of the HDPE-1 is increased to 50%.

Examples 6-10 are prepared using the first polymeric layer composition of Control 3 in layer 1 and layer 3 (skin layers), but contain different filled thermoplastic compositions in layer 2 (core layer). The filler in layer 2 for these examples is the Talc Masterbatch previously described, the Wood Flour Concentrate previously described, or blends of the Talc Masterbatch and the Wood Flour Concentrate.

TABLE 2 lists the formulations of layer 1, layer 2, and layer 3 for Control 3 and Examples 6-10. TABLE 2 also lists relative thicknesses of the skin layers and the core layer. The modulus and tear resistance for these samples are listed in TABLE 2. These results show that the tear resistance decreases and the modulus increases for Examples 6-10 compared with Control 3. Again, the desirable performance (low tear resistance and high modulus) is expected when the filled polymer composition (layer 2) contains high concentrations of the Wood Flour Concentrate.

Examples 11-14 are prepared using the first adhesive composition of Control 3 in layer 1. Example 11 also uses this same adhesive composition for layer 3, whereas Examples 12-14 are bi-layered structures and do not have a third layer. The filler in layer 2 for Examples 11-12 is calcium carbonate at a concentration of 75% by weight of this layer. The filler in layer 2 for Examples 13-14 is talc at a concentration of 25% by weight of this layer.

TABLE 3 lists the formulations for layer 1, layer 2, and layer 3 for Examples 11-14. TABLE 3 also lists the relative thicknesses of each layer. The modulus and tear resistance for these samples are listed in TABLE 3. These results show that the tear resistance decreases and the modulus increases for Examples 11-14 compared with Control 3. Again, the desirable performance (low tear resistance and high modulus) is expected when the filled polymer composition (layer 2) contains high concentrations of either talc or calcium carbonate.

While the embodiments of the invention disclosed herein are presently considered preferred, various improvements and modifications can be made without departing from the spirit and scope of the invention. The scope of the invention is indicated in the appended claims, and all changes that fall within the meaning and range of equivalents are intended to be embraced therein.

TABLE 1

|  | Cntrl 1 | Cntrl 2 | Ex. 1 | Ex. 2 | Ex. 3 | Ex. 4 | Ex. 5 |
|---|---|---|---|---|---|---|---|
| Layer 1 (15% of total thickness) | | | | | | | |
| HDPE-1 | 20% | 20% | 20% | 20% | 20% | 20% | 20% |
| Plexar PX3236 | 50% | 50% | 50% | 50% | 50% | 50% | 50% |
| Talc(50%)/HDPE-2 masterbatch 30% | 30% | 30% | 30% | 30% | 30% | 30% | 30% |
| Layer 2 (70% of total thickness) | | | | | | | |
| HDPE-1 | $$ | $$ | $$ | $$ | $$ | $$ | $$ |
| Plexar PX3236 | 50% | | | | | | |
| Talc Masterbatch | 30% | | | | | $$ | $$ |
| Wood Flour (50%) Concentrate | | | 10% | 20% | 30% | $$ | $$ |
| Layer 3 (15% of total thickness) | | | | | | | |
| HDPE-1 | 20% | 20% | 20% | 20% | 20% | 20% | 20% |
| Plexar PX3236 | 50% | 50% | 50% | 50% | 50% | 50% | 50% |
| Talc(50%)/HDPE-2 masterbatch | 30% | 30% | 30% | 30% | 30% | 30% | 30% |
| Filler concentration of Multi-Layered Tape | | | | | | | |
| Talc, wt % | 15.0% | 4.5% | 4.5% | 4.5% | 4.5% | 11.5% | 15.0% |
| Wood flour, wt % | 0.0% | 0.0% | 3.5% | 7.0% | 10.5% | 3.5% | 0.0% |
| Total filler, wt % | 15.0% | 4.5% | 8.0% | 11.5% | 15.0% | 15.0% | 15.0% |
| Tensile modulus, MPa | | | | | | | |
| Average Modulus | 490 | 465 | 472 | 699 | 721 | 702 | 707 |
| Tear Resistance, transverse direction kJ/m$^2$ | 194 | 276 | 122 | 122 | 86 | 77 | 166 |

TABLE 2

| Unfilled Adhesive Composition | | | | | | |
|---|---|---|---|---|---|---|
|  | Cntrl 3 | Ex. 6 | Ex. 7 | Ex. 8 | Ex. 9 | Ex. 10 |
| Layer 1 (15% of total thickness) | | | | | | |
| HDPE-1 | 50% | 50% | 50% | 50% | 50% | 50% |
| Plexar PX3236 | 50% | 50% | 50% | 50% | 50% | 50% |
| Talc(50%)/HDPE masterbatch | | | | | | |
| Layer 2 (70% of total thickness) | | | | | | |
| HDPE-1 | 100% | 90% | 80% | 70% | 70% | 70% |
| Plexar PX3236 | | | | | | |
| Talc Masterbatch | | | | | 20% | 30% |
| Wood Flour (50%) Concentrate | | 10% | 20% | 30% | 10% | |
| Layer 3 (15% of total thickness) | | | | | | |
| HDPE-1 | $$ | $$ | $$ | $$ | $$ | $$ |
| Plexar PX3236 | $$ | $$ | $$ | $$ | $$ | $$ |
| Talc(50%)/HDPE masterbatch | | | | | | |
| Filler Concentration of multi-layered tape | | | | | | |
| Talc, wt % | 0.0% | 0.0% | 0.0% | 0.0% | 7.0% | 10.5% |
| Wood flour, wt % | 0.0% | 3.5% | 7.0% | 10.5% | 3.5% | 0.0% |
| Total filler, wt % | 0.0% | 3.5% | 7.0% | 10.5% | 10.5% | 10.5% |
| Tensile modulus, MPa | | | | | | |
| Average Modulus | 497 | 534 | 585 | 664 | 614 | 632 |
| Tear Resistance, transverse direction kJ/m$^2$ | 372 | 188 | 144 | 70 | 110 | 231 |

TABLE 3

|  | Ex. 11 | Ex. 12 | Ex. 13 | Ex. 14 |
|---|---|---|---|---|
| Layer 1 | | | | |
| % of total thickness | 10% | 27% | 33% | 33% |
| Composition | | | | |

TABLE 3-continued

|  | Ex. 11 | Ex. 12 | Ex. 13 | Ex. 14 |
|---|---|---|---|---|
| HDPE-1 | 50% | 50% | 50% | 50% |
| Plexar PX3236 | 50% | 50% | 50% | 50% |
| Layer 2 | | | | |
| % of total thickness | 61% | 63% | 67% | 67% |
| Composition | | | | |
| CaCO$_3$ Concentrate (25% HDPE) | 100% | 100% | | |
| HDPE-1 | | | 50% | 50% |
| Talc Masterbatch (50% HDPE) | | | 50% | 50% |
| Layer 3 | | | | |
| % of total thickness | 29% | 0% | 0% | 0% |
| HDPE-1 | 50% | | | |
| Plexar PX3236 | 50% | | | |
| Filler concentration of | | | | |
| Multi-Layered Tape | | | | |
| Talc, wt % | 0% | 0% | 17% | 17% |
| Calcium carbonate, wt % | 46% | 47% | 0% | 0% |
| Total filler, wt % | 46% | 47% | 17% | 17% |
| Tensile modulus, MPa | | | | |
| Average Modulus | 761 | 853 | 650 | 728 |
| Tear Resistance, | | | | |
| transverse direction | | | | |
| kJ/m$^2$ | 45 | 54 | 47 | 38 |

We claim:

1. A fastener assembly for use in a fastener driving tool, comprising:
  a. a plurality of fasteners;
  b. a multi-layered structure including
    i. a first polymeric layer having a first surface for contacting the fasteners and a second surface and including a thermoplastic polymer backbone having at least 0.03% grafted maleic anhydride by weight of the first polymeric layer;
    ii. a second polymeric layer disposed on the first polymeric layer on the second surface, the second polymeric layer being sufficiently rigid for reinforcing the first polymeric layer, wherein the second polymeric layer includes an inorganic filler in an amount of about 3 to about 45% by weight of the second polymeric layer; and
  wherein the plurality of fasteners are carried on the multi-layered structure;
  wherein each of the first layer and the second layer have a substantially constant thickness over its length, and the ratio of the thickness of the first layer to the second layer ranges from about 1:25 to about 3:1;
  wherein the fastener assembly is prepared by a process including a first step of extrusion coating a backing layer with the first polymeric layer and the second polymeric layer, or a first step of co-extruding the first polymeric layer and the second polymeric layer without a backing layer, to form the multi-layered structure; and a second step of engagingly contacting the multilayered structure to the plurality of fasteners; and
  wherein the first polymeric layer includes a polar functional moiety that provides adhesion to the fasteners.

2. The fastener assembly of claim 1, wherein
  a. the thermoplastic polymeric backbone of the first polymeric layer includes a polyolefin backbone;
  b. a backing layer is disposed over at least a portion of the length of the multi-layered structure; and
  c. the ratio of the thickness of the first layer to the second layer is from about 1:9 to about 2:1.

3. The fastener assembly of claim 2, wherein the second polymeric layer further includes an organic filler selected from the group consisting of wood flour, ground rice hull, ground husks, ground nut shells, ground fruit pits, kenaf particles, sago particles, jute particles, and any combination thereof.

4. A fastener assembly for use in a fastener driving tool, comprising:
  a) at least one row of a plurality of fasteners, each of the fasteners being arranged substantially parallel to each other;
  b) two opposing multi-layered structures bonded to the fasteners and maintaining them in the substantially parallel arrangement in the row;
  wherein the multi-layered structures each comprises:
    i. a first polymeric layer formed from an extrudable first adhesive composition; wherein the first adhesive composition comprises an extrudable thermoplastic polymer backbone which comprises a homopolymer or copolymer of ethylene having at least about 0.03% by weight of the polymer of maleic anhydride;
    ii. a second polymeric layer formed from an extrudable filled polymeric composition which provides stiffness to the fastener assembly; wherein the filled polymeric composition comprises from about 3 to about 75% of a particulate filler based on the total weight of the filled polymeric composition; and
    iii. the thickness of the second polymeric layer, formed from the filled polymeric composition, is greater than the thickness of the first polymeric layer formed from the first adhesive composition;
  wherein the plurality of fasteners is sandwiched between the two opposing multi-layered structures;
  wherein the fastener assembly is prepared by a process including a first step of extrusion coating a backing layer with the first polymeric layer and the second polymeric layer, or a first step of co-extruding the first polymeric layer and the second polymeric layer without a backing layer, to form the multi-layered structure; and a second step of engagingly contacting the multilayered structure to the plurality of fasteners; and
  wherein the first polymeric layer includes a polar functional moiety that provides adhesion to the fasteners.

5. The fastener assembly of claim 4, wherein
  a. each multi-layered structure is a multi-layered tape;
  b. the first polymeric layers are bonded to the row of fasteners;
  c. a backing layer is disposed over at least a portion of the length of the tape; and
  d. the ratio of the thickness of the first layer to the second layer is from about 25:1 to about 3:1.

6. The fastener assembly of claim 5, wherein the filled polymeric composition comprises from about 8% to about 35% organic filler by weight of the total filled polymeric composition, wherein the organic filler includes a filler selected from the group consisting of wood flour, ground rice hull, ground husks; ground nut shells, ground fruit pits, kenaf particles, sago particles, jute particles, and any combination thereof.

7. The fastener assembly of claim 5, wherein the filled polymeric composition comprises an organic filler, an inorganic filler, or a mixture of an organic filler and an inorganic filler; and wherein the first polymeric layer of the multi-layered structure is formed by a step of extrusion coating onto the backing layer.

8. A fastener assembly for use in a fastener driving tool, comprising:
   a) at least one row of a plurality of nails, each of the nails being arranged substantially parallel to each other;
   b) a multi-layered structure bonded to the nails and maintaining them in the substantially parallel arrangement in the row;
   wherein the multi-layered structure comprises:
      i. a first polymeric layer formed from an extrudable first adhesive composition; wherein the first adhesive composition comprises an extrudable polymer backbone which has been reacted with a polar moiety; and
      ii. a second polymeric layer formed from an extrudable filled polymeric composition which provides stiffness to the fastener assembly; wherein the filled polymeric composition comprises from about 3 to about 75% of a particulate filler based on the total weight of the filled polymeric composition;
   wherein the fastener assembly is prepared by a process including a first step of extrusion coating a backing layer with the first polymeric layer and the second polymeric layer, or a first step of co-extruding the first polymeric layer and the second polymeric layer without a backing layer, to form the multi-layered structure; and a second step of engagingly contacting the multilayered structure to the plurality of fasteners; and
   wherein the first polymeric layer includes a polar functional moiety that provides adhesion to the fasteners.

9. The fastener assembly of claim 8, wherein the multi-layered structure is a multi-layered tape, and wherein the first polymeric layer is bonded to one side of the row of fasteners.

10. The fastener assembly of claim 9, wherein the fasteners are selected from the group consisting of nails, screws, and staples.

11. The fastener assembly of claim 10, wherein the multi-layered tape further comprises a third polymeric layer formed from a composition which comprises an extrudable polymeric backbone which has been reacted with a polar moiety, wherein the third polymer layer is substantially not in contact with the first polymeric layer; and wherein the second layer is located between the first polymeric layer and the third polymer layer.

12. The fastener assembly of claim 10, wherein the row of fasteners is bonded on the reverse side to a second of the multi-layered tape.

13. The fastener assembly of claim 10, wherein the filled polymeric composition optionally includes polar moieties, and wherein the Concentration of polar moieties in the filled polymeric composition is less than the concentration of polar moieties in the extrudable first adhesive composition.

14. The fastener assembly of claim 10, wherein the thickness of the first polymeric layer is less than about 100 µm.

15. The fastener assembly of claim 10, wherein the filler of the filled polymeric composition is reactive with the polar moiety of the first adhesive composition.

16. The fastener assembly of claim 10, wherein the polar moiety of the extrudable first adhesive composition comprises a compound selected from the group consisting of unsaturated carboxylic acids; functional derivatives of carboxylic acids including anhydrides, esters and amides; metal salts of unsaturated carboxylic acids; imides; and mixtures of the foregoing.

17. The fastener assembly of claim 16, wherein the polar moiety of the first adhesive composition comprises maleic anhydride.

18. The fastener assembly of claim 16, wherein the filler of the filled polymeric composition comprises an inorganic filler selected from the group consisting of talc, calcium carbonate, clay, and mixtures thereof.

19. The fastener assembly of claim 18, wherein the filler of the filled polymeric composition further comprises from about 3% to about 45% organic filler by weight of the total filled polymeric composition of an organic filler selected from the group consisting of wood flour, ground rice hull, and mixtures thereof.

20. The fastener assembly of claim 19, wherein the filler of the filled polymeric composition comprises wood flour and talc.

21. The fastener assembly of claim 18, wherein the polymer backbone of the first adhesive composition comprises a thermoplastic material selected from the group consisting of polyethylene, polypropylene, copolymers of ethylene with other alpha-olefins, copolymers of propylene with other alpha-olefins, copolymers of ethylene with ethylenically unsaturated esters and their derivatives, and mixtures thereof.

* * * * *